United States Patent
Liu et al.

(10) Patent No.: US 11,010,564 B2
(45) Date of Patent: May 18, 2021

(54) METHOD FOR FINE-GRAINED AFFECTIVE STATES UNDERSTANDING AND PREDICTION

(71) Applicant: INTERNATIONAL BUSINESS MACHINES CORPORATION, Armonk, NY (US)

(72) Inventors: Zhe Liu, San Jose, CA (US); Jalal Mahmud, San Jose, CA (US); Anbang Xu, San Jose, CA (US); Yufan Guo, San Jose, CA (US); Haibin Liu, San Jose, CA (US); Rama Kalyani T. Akkiraju, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/507,953

(22) Filed: Jul. 10, 2019

(65) Prior Publication Data

US 2020/0250278 A1    Aug. 6, 2020

Related U.S. Application Data

(63) Continuation of application No. 16/268,105, filed on Feb. 5, 2019.

(51) Int. Cl.
*G06F 40/30* (2020.01)
*G06N 3/04* (2006.01)
*G06N 3/08* (2006.01)

(52) U.S. Cl.
CPC .............. *G06F 40/30* (2020.01); *G06N 3/04* (2013.01); *G06N 3/08* (2013.01)

(58) Field of Classification Search
CPC .......... G06F 40/58; G06F 40/44; G06F 40/45; G06F 40/47; G06F 16/35; G06N 20/00
See application file for complete search history.

(56) References Cited

U.S. PATENT DOCUMENTS

| 6,134,532 A | 10/2000 | Lazarus et al. |
| 7,523,085 B2 | 4/2009 | Nigam et al. |
| 8,332,339 B2 | 12/2012 | Nugent |

(Continued)

FOREIGN PATENT DOCUMENTS

| CN | 103995803 A | * | 8/2014 |
| CN | 106776581 A | * | 5/2017 |

(Continued)

OTHER PUBLICATIONS

Tang, Learning Sentiment-Specific Word Embeding for Twitter Sentiment Classification, 2014, ACL pp. 1555-1565 (Year: 2014).*

(Continued)

*Primary Examiner* — Lamont M Spooner
(74) *Attorney, Agent, or Firm* — Conley Rose, P.C.

(57) ABSTRACT

A computer-implemented method for fine-grained affective states prediction. The computer-implemented method creates training data comprising content conveying emotions. The method creates a trained model by performing an emotion vector space model training process using the training data to train a model using a feed forward neural network that converts discrete emotions into emotion vector representations. The trained model can be used to predict fine-grained affective states for text conveying an emotion.

20 Claims, 5 Drawing Sheets

(56) References Cited

U.S. PATENT DOCUMENTS

| | | | |
|---|---|---|---|
| 8,892,422 B1 | 11/2014 | Kumar | |
| 9,201,876 B1 | 12/2015 | Kumar et al. | |
| 9,336,192 B1* | 5/2016 | Barba | G06F 40/30 |
| 10,331,648 B2 | 6/2019 | Wang et al. | |
| 10,459,962 B1* | 10/2019 | Jayaraman | G06F 16/3329 |
| 10,650,097 B2* | 5/2020 | Yin | G06F 40/30 |
| 2007/0026365 A1* | 2/2007 | Friedrich | G16H 70/60 |
| | | | 434/127 |
| 2011/0208753 A1* | 8/2011 | Sivadas | G06F 3/015 |
| | | | 707/749 |
| 2012/0284080 A1* | 11/2012 | De Oliveira | G06Q 30/0202 |
| | | | 705/7.29 |
| 2014/0108309 A1* | 4/2014 | Frank | G07C 13/00 |
| | | | 706/12 |
| 2014/0114655 A1* | 4/2014 | Kalinli-Akbacak | G10L 25/63 |
| | | | 704/231 |
| 2014/0195518 A1* | 7/2014 | Kelsey | G06F 16/367 |
| | | | 707/722 |
| 2015/0213002 A1 | 7/2015 | Gou et al. | |
| 2015/0302478 A1 | 10/2015 | Michael | |
| 2016/0203402 A1* | 7/2016 | Hanlon | G06N 5/02 |
| | | | 706/46 |
| 2016/0224869 A1* | 8/2016 | Clark-Polner | G06Q 50/00 |
| 2017/0185581 A1* | 6/2017 | Bojja | G06K 9/6269 |
| 2018/0082679 A1* | 3/2018 | McCord | G10L 13/033 |
| 2018/0107945 A1* | 4/2018 | Gao | G06N 7/005 |
| 2018/0184959 A1* | 7/2018 | Takahashi | A61B 5/1176 |
| 2018/0189274 A1* | 7/2018 | Noh | G06F 40/10 |
| 2018/0314982 A1* | 11/2018 | Gopalan | G06N 20/00 |
| 2018/0357286 A1* | 12/2018 | Wang | G06F 16/24578 |
| 2019/0050875 A1* | 2/2019 | McCord | G10L 25/63 |
| 2019/0138599 A1* | 5/2019 | Sen | G06F 40/253 |
| 2019/0155918 A1* | 5/2019 | Jaroch | G06N 3/084 |
| 2019/0156838 A1* | 5/2019 | Kannan | G10L 15/22 |
| 2019/0164540 A1* | 5/2019 | Park | G10L 15/22 |
| 2019/0180395 A1* | 6/2019 | Moretti | G06Q 50/182 |
| 2019/0244119 A1* | 8/2019 | Farri | G06N 3/08 |
| 2019/0256107 A1* | 8/2019 | Park | B60W 50/14 |
| 2019/0294732 A1* | 9/2019 | Srinivasan | G06F 16/36 |
| 2019/0311039 A1* | 10/2019 | Plant | G06F 40/56 |
| 2020/0058269 A1* | 2/2020 | Zhao | H04R 1/028 |
| 2020/0065873 A1* | 2/2020 | Ruvini | G06F 16/31 |
| 2020/0104367 A1* | 4/2020 | Tagra | G06K 9/6218 |
| 2020/0218780 A1* | 7/2020 | Mei | G06N 3/08 |
| 2020/0242421 A1* | 7/2020 | Sobhany | G06F 3/017 |
| 2020/0265076 A1* | 8/2020 | Kershaw | G06F 40/30 |

FOREIGN PATENT DOCUMENTS

| | | | | |
|---|---|---|---|---|
| CN | 106815192 A | * | 6/2017 | |
| CN | 106850126 A | * | 6/2017 | H04W 72/042 |
| CN | 109740154 A | * | 5/2019 | |

OTHER PUBLICATIONS

Velioglu et al., Sentiment analysis using learning approaches over emojis for Turkish Tweets, 2018, IEEEexplore, pp. 303-307 (Year: 2018).*

Regina Bernhaupt, Andreas Boldt, Thomas Mirlacher, David Wilfinger and Manfred Tscheligi. 2007. Using emotion in games: emotional flowers. In Proceedings of ACE, 41-48.

Jeffrey T Hancock, Christopher Landrigan and Courtney Silver. 2007. Expressing emotion in text-based communication. In Proceedings of SIGCHI, 929-932.

Katri Salminen, Veikko Surakka, Jani Lylykangas, Jukka Raisamo, Rami Saarinen, Roope Raisamo, Jussi Rantala and Grigori Evreinov. 2008. Emotional and behavioral responses to haptic stimulation. In Proceedings of SIGCHI, 1555-1562.

James A Russell and Lisa Feldman Barrett. 1999. Core affect, prototypical emotional episodes, and other things called emotion: dissecting the elephant. Journal of personality and social psychology, 76, 5 (1999), 805.

Johnny Rj Fontaine, Klaus R Scherer, Etienne B Roesch and Phoebe C Ellsworth. 2007. The world of emotions is not two-dimensional. Psychological science, 18, 12 (2007), 1050-1057.

Robert Plutchik. 1980. Emotion: A psychoevolutionary synthesis. Harpercollins College Division.

Paul Ekman. 1992. An argument for basic emotions. Cognition & emotion, 6, 3-4 (1992), 169-200.

Philip Nicholas Johnson-Laird and Keith Oatley. 1989. The language of emotions: An analysis of a semantic field. Cognition and emotion, 3, 2 (1989), 81-123.

Silvan Tomkins. 1962. Affect imagery consciousness: vol. I: The positive affects. Springer.

Quoc Le and Tomas Mikolov. 2014. Distributed representations of sentences and documents. In Proceedings of ICML, 1188-1196.

Richard J Gerrig, Philip G Zimbardo, Andrew J Campbell, Steven R Cumming and Fiona J Wilkes. 2015. Psychology and life. Pearson Higher Education.

Ja Ressel. 1980. A circumplex model of affect. J. Personality and Social Psychology, 39 (1980), 1161-1178.

Margaret M Bradley, Mark K Greenwald, Margaret C Petry and Peter J Lang. 1992. Remembering pictures: Pleasure and arousal in memory. Journal of experimental psychology: Learning, Memory, and Cognition, 18, 2 (1992), 379-390.

Andrew Ortony and Terence J Turner. 1990. What's basic about basic emotions? Psychological review, 97, 3 (1990), 315.

Carroll E Izard. 1992. Basic emotions, relations among emotions, and emotion-cognition relations. Psychological Review, 99(3), 561-565.

Eugene Y Bann and Joanna J Bryson. 2013. The conceptualisation of emotion qualia: Semantic clustering of emotional tweets. In Proceedings of NCPW, 249-263.

Kirsten Boehner, Rogerio Depaula, Paul Dourish and Phoebe Sengers. 2007. How emotion is made and measured. International Journal of Human-Computer Studies, 65, 4 (2007), 275-291.

Klaus R Scherer. 2005. What are emotions? And how can they be measured? Social science information, 44, 4 (2005), 695-729.

Margaret M Bradley and Peter J Lang. 1999. Affective norms for English words (ANEW): Instruction manual and affective ratings. Technical report C-1, the center for research in psychophysiology, University of Florida.

Saif M Mohammad, Svetlana Kiritchenko and Xiaodan Zhu. 2013. NRC-Canada: Building the state-of-the-art in sentiment analysis of tweets. In Proceedings of SemEval, 321-327.

Ethan Fast, Binbin Chen and Michael S Bernstein. 2016. Empath: Understanding topic signals in large-scale text. In Proceedings of SIGCHI, 4647-4657.

Christian Peter, Russell Beale, Elizabeth Crane and Lesley Axelrod. 2007. Emotion in HCI. In Proceedings of BCS HCI, 211-212.

Munmun De Choudhury, Scott Counts and Eric Horvitz. 2013. Predicting postpartum changes in emotion and behavior via social media. In Proceedings of SIGCHI, 3267-3276.

Clayton Epp, Michael Lippold and Regan L Mandryk. 2011. Identifying emotional states using keystroke dynamics. In Proceedings of SIGCHI, 715-724.

Munmun De Choudhury, Scott Counts and Michael Gamon. 2012. Not all moods are created equal! exploring human emotional states in social media. In Proceedings of ICWSM, 66-73.

Tomas Mikolov, Ilya Sutskever, Kai Chen, Greg S Corrado and Jeff Dean. 2013. Distributed representations of words and phrases and their compositionality. In Proceedings of NIPS, 3111-3119.

Giuseppe Castellucci, Danilo Croce and Roberto Basili. 2015. Acquiring a large scale polarity lexicon through unsupervised distributional methods. In Proceedings of NLDB, 73-86.

Maria Giatsoglou, Manolis G Vozalis, Konstantinos Diamantaras, Athena Vakali, George Sarigiannidis and Konstantinos Ch Chatzisavvas. 2017. Sentiment analysis leveraging emotions and word embeddings. Expert Systems with Applications, 69 (2017), 214-224.

Qiang Chen, Wenjie Li, Yu Lei, Xule Liu and Yanxiang He. 2015. Learning to Adapt Credible Knowledge in Cross-lingual Sentiment Analysis. In Proceedings of the ACL, 419-429.

(56) References Cited

OTHER PUBLICATIONS

Zichao Yang, Diyi Yang, Chris Dyer, Xiaodong He, Alexander J Smola and Eduard H Hovy. 2016. Hierarchical Attention Networks for Document Classification. In Proceedings of HLT-NAACL, 1480-1489.
Andrew M Dai, Christopher Olah and Quoc V Le. 2014. Document Embedding with Paragraph Vectors. In Proceedings of the NIPS.
Marie-Catherine De Mameffe, Bill Maccartney and Christopher D Manning. 2006. Generating typed dependency parses from phrase structure parses. In Proceedings of LREC, 449-454.
Wenbo Wang, Lu Chen, Krishnaprasad Thirunarayan and Amit P Sheth. 2012. Harnessing twitter "big data" for automatic emotion identification. In Proceedings of SocialCom, 587-592.
Radim Rehurek and Petr Sojka. 2010. Software framework for topic modelling with large corpora. In Proceedings of the LREC, 46-50.
Burt L Monroe, Michael P Colaresi and Kevin M Quinn. 2008 Fightin'words: Lexical feature selection and evaluation for identifying the content of political conflict Political Analysis, 16, 4 (2008), 372-403.
Supun Nakandala, Giovanni Luca Ciampaglia, Norman Makoto Su and Yong-Yeol Ahn. 2016. Gendered Conversation in a Social Game-Streaming Platform. In Proceedings of ICWSM, 162-171.
Beverley Fehr and James A Russell. 1984. Concept of emotion viewed from a prototype perspective. Journal of experimental psychology: General, 113, 3 (1984), 464.
William James. 1884. What is an emotion? Mind, 9, 34 (1884), 188-205.
Saif M Mohammad and Peter D Turney. 2013. Crowdsourcing a word—emotion association lexicon. Computational Intelligence, 29, 3 (2013), 436-465.
IBM, "An Emotion Broker to Convey Contextual Information to Enhance Communications," IPCOM000182883D, May 8, 2009, 4 pages.
Anonymously, "Emotion Analyzing Tool for Customer Requests Handling," IPCOM000206050D, Apr. 13, 2011, 3 pages.
Anonymously, "Leveraging Semantic Analysis for Notification Management," IPCOM000241338D, Apr. 17, 2015, 5 pages.
Saravia, et al., "DeepEmo: Learning and Enriching Pattern-Based Emotion Representations," cs.CL arXiv:1804.08847v1, Apr. 24, 2018, 11 pages.
Kahou, "Emotion Recognition with Deep Neural Networks," Univeriste de Montreal, 2016, 145 pages.
Tripathi, et al., "Using Deep and Convolutional Neural Networks for Accurate Emotion Classification in DEAP Dataset," Proceedings of the Twenty-Ninth AAAI Conference on Innovative Applications (IAAI-17), 2017, pp. 4746-4752.
Taner Danisman and Adil Alpkocak. 2008. Feeler: Emotion classification of text using vector space model. In Proceedings of AISB, 53, 98 pages.
James W Pennebaker, Martha E Francis and Roger J Booth. 2001 Linguistic inquiry and word count: LIWC 2001. Mahway: Lawrence Erlbaum Associates, 71., 23 pages.
List of IBM Patents or Patent Applications Treated as Related, Jul. 10, 2019, 2 pages.
Office Action dated Sep. 18, 2020, U.S. Appl. No. 16/268,105, filed Feb. 5, 2019, 28 pages.
Office Action dated Feb. 3, 2021, U.S. Appl. No. 16/268,105, filed Feb. 5, 2019, 24 pages.

* cited by examiner

METHOD FOR FINE-GRAINED AFFECTIVE STATES UNDERSTANDING AND PREDICTION

BACKGROUND

Emotion, as a fundamental component of being human, plays an important role in our everyday lives. Numerous studies have been conducted in attempts to better characterize human emotion. Many researchers believed that as a subjective cognitive representation, emotion should be best measured using the traditional psychology-based approaches, such as self-reporting and observation. One key disadvantage of both the self-reporting and observation-based methods is that their results highly depend on the participants and are usually very hard to be conducted in large scales. Another problem is that both methods treat emotions as discrete states and ignore the inter-emotion relationships.

While noticing the drawbacks of the self-reporting and observation-based methods, computer scientists proposed several computational approaches with the aim to better understand and model human emotions. Many studies have demonstrated that individual's emotions are highly correlated with their writings and can be successfully predicted through affective text mining. Affect is a concept used in psychology to describe the experience of feeling or emotion. Various emotional lexicons were built with keywords or phrases that associated with emotions. However, due to its lack of theoretical foundation, existing emotion detection methods fail to detect the subtle difference between similar affective states (e.g. sad vs. hurt), and are only limited to detect the few basic emotions, such as angry, sad, happy, etc.

SUMMARY

Aspects of the disclosed embodiments include a computer-implemented method for fine-grained affective states prediction. The computer-implemented method creates training data comprising content conveying emotions. The method creates a trained model by performing an emotion vector space model training process using the training data to train a model using a feed forward neural network that converts discrete emotions into emotion vector representations. The trained model can be used to predict fine-grained affective states for text conveying an emotion.

In various embodiments, dimension reduction and rotation techniques can be applied on the trained model to identify a principle dimension of a set of fine-grained affective states, clustering techniques can be applied on the trained model to identify basic emotions of a set of fine-grained affective states, and/or a domain-specific emotional taxonomy can be generated using the trained model.

Other aspects and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
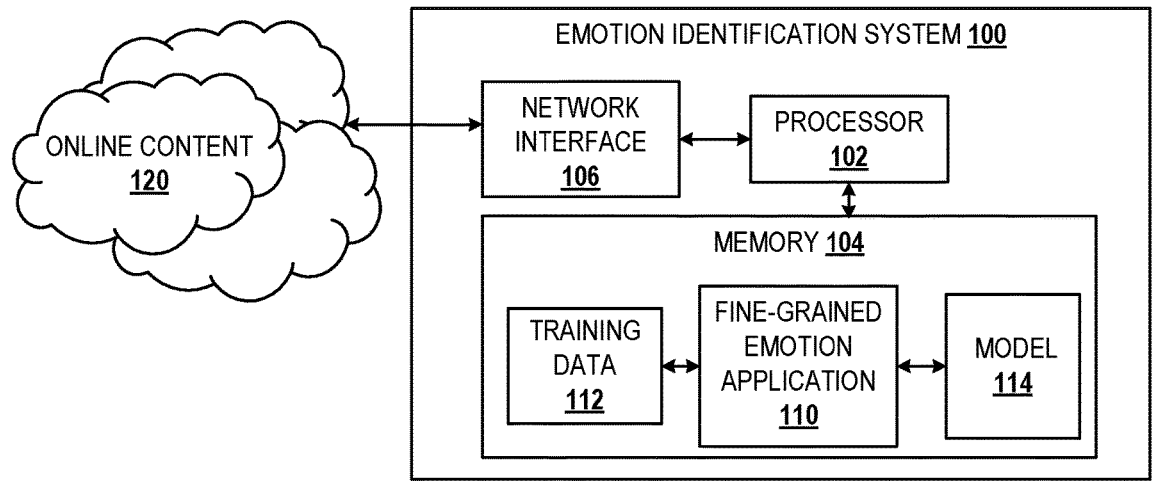
FIG. 1 is a schematic diagram illustrating an emotion identification system according to an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module as referenced herein may comprise of software components such as, but not limited to, data access objects, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

For example, as will be further described herein, the disclosed embodiments can include a module for building a vector space representation of fine-grained affective states as well as their corresponding word representations, a module for valence-arousal understanding and prediction, a module for basic emotion understanding and prediction, and a module for building domain-specific emotional taxonomy.

Also, as referenced herein, the terms "communicate(s)" or "communicatively coupled" mean capable of sending and/or data over a communication link. In certain embodiments, communication links may also encompass internal communication between various components of a system and/or with an external input/output device such as a keyboard or display device. Additionally, the communication link may include both wired and wireless links, and may be a direct link or may comprise of multiple links passing through one or more communication network devices such as, but not limited to, routers, firewalls, servers, and switches. The network device may be located on various types of networks.

A network as used herein means a system of electronic devices that are joined together via communication links to enable the exchanging of information and/or the sharing of resources. Non-limiting examples of networks include local-area networks (LANs), wide-area networks (WANs), and metropolitan-area networks (MANs). The networks may include one or more private networks and/or public networks such as the Internet. The networks may employ any type of communication standards and/or protocol.

Unless specifically indicated, any reference to the processing, retrieving, and storage of data and computer executable instructions may be performed locally on an electronic device and/or may be performed on a remote network device. For example, data may be retrieved or stored on a data storage component of a local device and/or may be retrieved or stored on a remote database or other data storage systems. Additionally, the processing of certain data or instructions may be performed over the network by one or more systems or servers, and the result of the processing of the data or instructions may be transmitted to a local device.

The disclosed embodiments propose a system and method that enable emotions to be better quantified on a finer-granularity. A goal of the disclosed embodiments is trying to learn human emotions from an individual's language use. In particular, the disclosed embodiments aim to quantify fine-grained emotional states in vector representations. With the learned emotion vector representations, users can better understand the differences between distinct fine-grained emotions, by conducting direct comparisons between emotions based on their vector representations, as well as learning the latent dimension of emotions and the basic set of emotions. To be more specific, the disclosed embodiments produce a set of emotional vectors, which can be used to further analyze inter-emotion or inter-emotional word relationships. A classification model is also developed as a byproduct of the learned emotion representations. Additionally, the disclosed embodiments develop a neural network based model which utilizes the context information among emotional indicators within an emotion document for prediction purpose.

Advantages of the disclosed embodiments include, but are not limited to, reducing or eliminating reliance on the emotional content collected from online and offline sources; helping individuals to better understand the fine-grain affective states, along with their underlying valence-arousal degrees, and the super ordinate-level emotions; providing researchers a new way to conduct emotion studies on large scale in a human-independent manner; enabling recognition of all possible emotions in a specific domain, capturing the nuance variations in human emotions from the individual's explicit and implicit word usages; and improving user interactions.

With reference now to the drawings, FIG. 1 is a schematic diagram illustrating an emotion identification system 100 according to an embodiment of the present disclosure. For simplicity purposes only, the emotion identification system 100 is shown to include a processor 102, memory 104, and network interface 106. A more detailed example of a system in which the disclosed embodiments can be implemented is described below in reference to FIG. 6.

In the depicted embodiment, the memory 104 can be volatile or nonvolatile memory that is used to store data and computer executable instructions for a fine-grained emotion application 110. The network interface 106 is used to communicate with other devices over a communication network. For example, in some embodiments, the network interface 106 is used to retrieve online content 120, which can be used as training data 112 for the fine-grained emotion application 110. As will be further described, the fine-grained emotion application 110 is configured to use the training data to train a model 114 using a feed forward neural network. The training process converts discrete emotions into vector representations. The training process produces similar vector representations for semantically-close emotions as a by-product of the prediction task and their closeness can be calculated using various techniques such as cosine similarity. The trained model can then be used to predict fine-grained affective states for any texts conveying an emotion.

Figure 2:
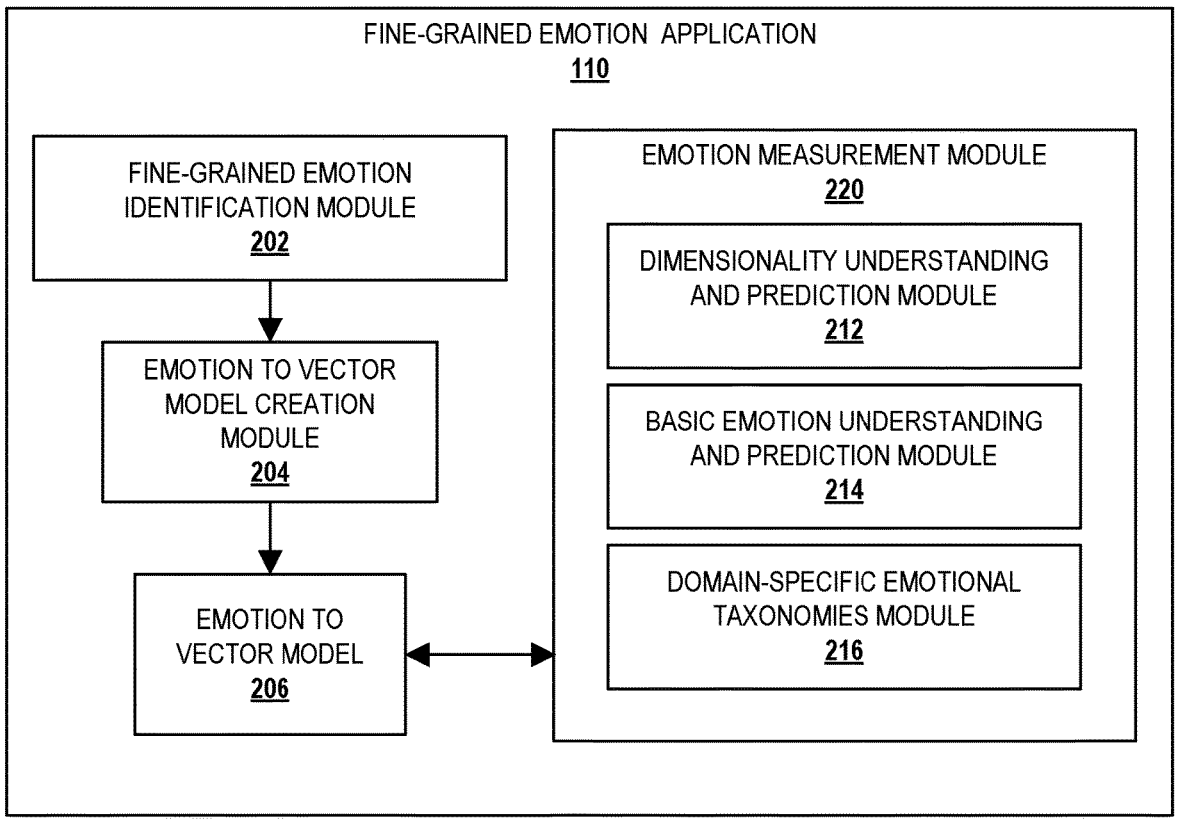
FIG. 2 is a schematic diagram illustrating a fine-grained emotion identification application according to an embodiment of the present disclosure.

FIG. 2 is a schematic diagram illustrating a fine-grained emotion identification application 110 according to an embodiment of the present disclosure. In the depicted embodiment, the fine-grained emotion identification application 110 includes a fine-grained emotion identification module 202, an emotion to vector model creation module 204, an emotion to vector model 206, and an emotion measurement module 220.

In an embodiment, the fine-grained emotion identification module 202 is configured to create or obtain the training data 112, which comprises content conveying emotions. The initial list of emotions for the training data 112 can be obtained or created in various ways. For example, in one embodiment, the fine-grained emotion identification module 202 can be configured to receive input from domain experts on a list of fine-grained emotions specific to a certain domain. In some embodiments, the fine-grained emotion identification module 202 can be configured to collect all possible human emotions from online content 120, such as, but not limited to, social media content. For example, in one embodiment, the fine-grained emotion identification module 202 can be configured to collect all possible human emotions from Twitter® postings (i.e., tweets) to create an initial set of find-grained human emotions. The fine-grained emotion identification module 202 can be configured to crawl tweets containing the keyword "feel", "feeling", and "felt" from Twitter®. For example, the fine-grained emotion identification module 202 can collect fine-grained emotions such as "happy", "secure", and "nervous" from sentences like "I hope you feel happy and secure quickly!!!" and "Already feeling nervous". In an embodiment, the fine-grained emotion identification module 202 can then use a dependency parser to construct dependency relations between words appearing in a tweet. Non-limiting examples of dependency parsers that can be used include the Stanford Parser, MaltParser, and MSTParser. The fine-grained emotion identification module 202 can then extract all the adjective and noun terms that have dependencies with the keywords and treat them as candidate emotions for the model training stage performed by the emotion to vector model creation module 204.

Figure 3:
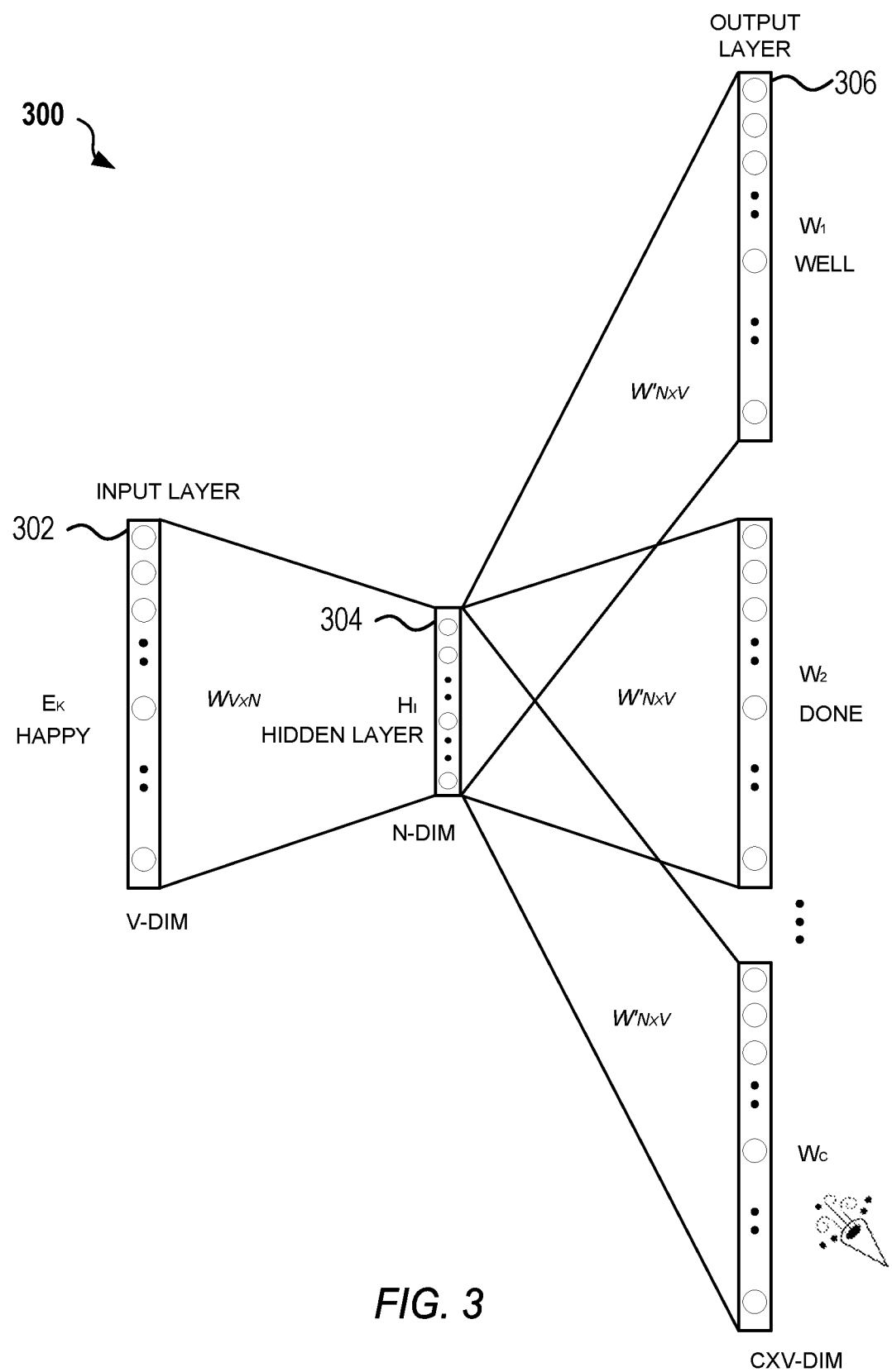
FIG. 3 is a schematic diagram illustrating a feed forward neural network for generating an emotion vector space according to an embodiment of the present disclosure.

The emotion to vector model creation module 204 is configured to train a model using the training data 112. In one embodiment, the emotion to vector model creation module 204 uses a feed forward neural network for training the model. An example of a feed forward neural network 300 in accordance with an embodiment of the present disclosure is illustrated in FIG. 3. The feed forward neural network 300 comprises of an input layer 302, a single hidden layer 304, and an output layer 306. In an embodiment, the emotion to vector model creation module 204 uses a set of V-dimension emotions as its input into the feed forward neural network 300, where V is a variable representing the total number of fine-grained emotions in the collected corpus. For instance, in one embodiment, V can be set to six to model just the basic emotions, including: anger, disgust, fear, happiness, sadness, and surprise.

In an embodiment, to form the input layer 302 to the feed forward neural network 300, the emotion to vector model creation module 204 combines all sentences expressing the same emotional state (e.g. "Happy") into a corresponding emotional document and assigns an identical emotion identifier (ID) to each of the sentences expressing the same emotional state. One emotion will be presented in the input layer each time during training and it will be encoded in the one-hot vector representation ($E_k$) of size V. Each unit in the input layer corresponds to a single emotion-id in the corpus. In an embodiment, when an emotion is presented during training, the unit corresponding to its id will be set to 1, and all other units will be set to 0. For example, the one-hot vector representation for emotion "anger" in the previous example will be [1,0,0,0,0,0], and the one-hot vector representation for emotion "happiness" will be [0,0,0,1,0,0].

The hidden layer $H_1$ has size N, which is the size of the emotion vectors that the model creation module 204 will output. In some embodiments, the size N is a free parameter that is chosen by the users. For example, with N set to 300, the learned emotion vectors will be all of 300 dimensions. Each $E_k$ is used to predict some randomly sampled adjacent words $\{w_1, w_2, \ldots, w_c\}$ that appeared within a sliding window of size c from the respective emotional document. The emotion to vector model creation module 204 converts the emotional state into vector representation and projects the vectors into a distributed vector space $W_{V \times N}$, where $H_1 = E_k W_{V \times N}$. Otherwise stated, given an emotion $E_k$, the hidden layer 304 samples consecutive words $\{w_1, w_2, \ldots, w_c\}$ from the respective emotional document with a sliding window size of c (e.g., the sliding window can be set to five, meaning five words behind and five words ahead of the given emotion ek), and uses them to learn emotion's vector representations $W_{V \times N}$.

The output layer is vectors containing the probabilities of words, or in some cases emojis, that are within the window size of the input word. For example, in the depicted embodiment, the output layer contains the vectors containing the probabilities that the word "well", the word "done", and the emoji . In one embodiment, the output layer 306 CXV-DIM is fully connected to the hidden layer 304, where CXV-DIM=$H_1 W'_{V \times N}$ In one embodiment, after training the hidden layer 304 is represented by a weight matrix with a row for every emotion and a column for every hidden neuron in the hidden layer 304. The rows of the weight matrix will contain the emotion vectors for each emotion. In one embodiment, the vector representations allow the fine-grained emotion identification application 110 to effectively quantify emotions, as well as decode the latent relationships between emotions.

In some embodiments, the emotion to vector model creation module 204 is configured to co-train the word vectors in an interleaved fashion while training the emotion representations. Even though this may make the training process less efficient, a benefit of doing so is to place both the emotion vectors and the word vectors (i.e., emotions as well as their corresponding expressions) into the same vector space, and thus making the emotion vectors more interpretable by their closeness to words. Once all the emotional states gathered the training data 112 is processed by the feed forward neural network 300, the emotion to vector model creation module 204 produces a trained emotion to vector model 206 that can be used to predict fine-grained affective states for text conveying an emotion and/or for various other applications.

For example, in the depicted embodiment, the emotion to vector model 206 can be used by the emotion measurement module 220, which can include a dimensionality understanding and prediction module 212; a basic emotion understanding and prediction module 214; and a domain-specific emotional taxonomies module 216.

In one embodiment, the dimensionality understanding and prediction module 212 is configured to use the emotion to vector model 206 for latent dimensionality understanding and prediction to capture the similarities and differences between various emotional experiences. In some embodiments, dimension reduction (e.g. principal component analysis, linear discriminant analysis) as well as rotation methods (e.g. varimax, quartimax, and promax) can be applied to the learned emotion vector representations as derived from the previous step. The derived dimensions can then be examined or named as the principle dimensions of emotions.

Figure 4:
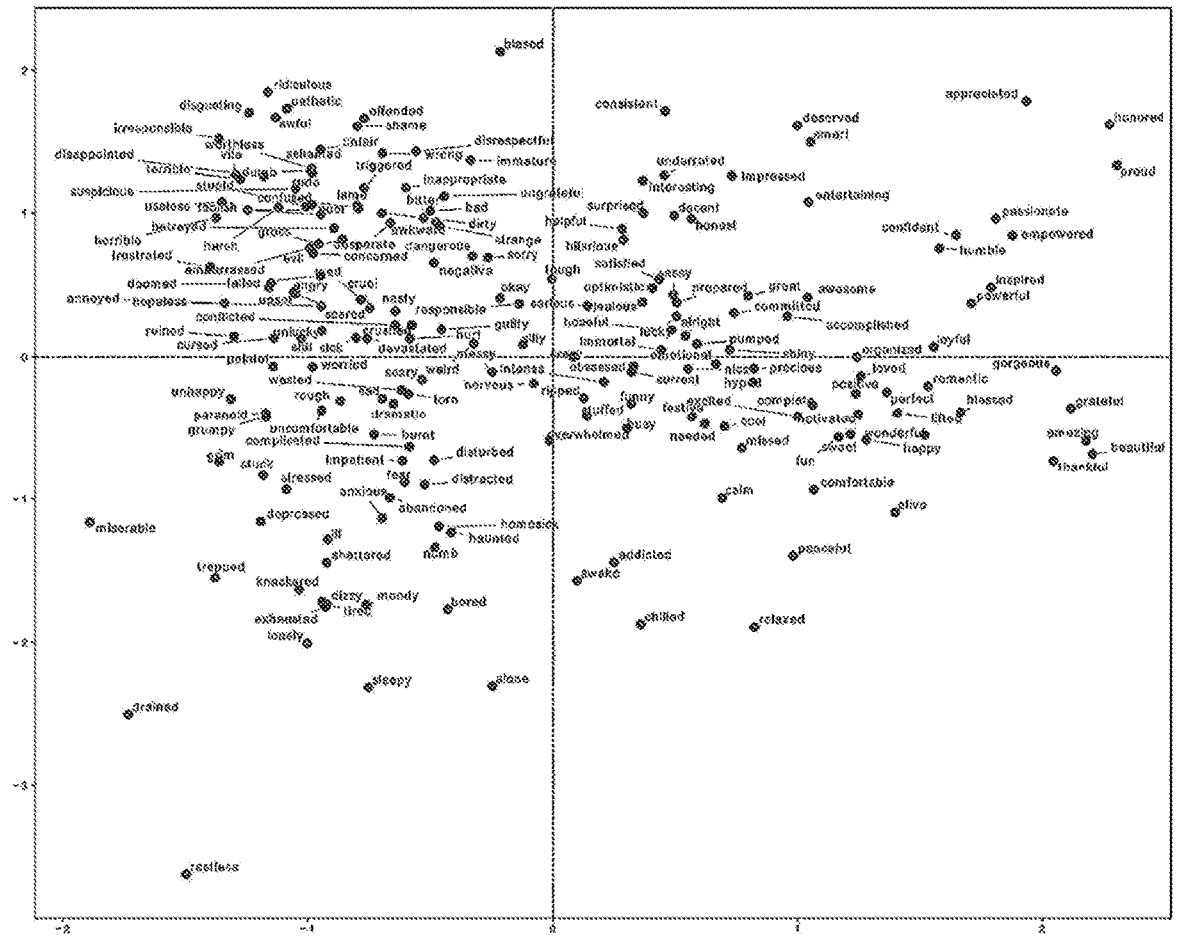
FIG. 4 is a graph plotting various fine-grained affective states according to an embodiment of the present disclosure.

For instance, FIG. 4 is a graph illustrating some example results of the emotional dimensions after applying principle component analysis (PCA) with varimax rotation on the vector representations of the emotions. The vertical principle dimension in this example can be treated as arousal and the horizontal dimension can be viewed as valence, which is consistent with the emotional dimensions as proposed in the mainstream Russell's Circumplex model. For example, as shown in FIG. 4, the emotion "offended" is of high arousal and negative valence, and the emotion "along" is of low arousal and negative valence. Thus, the disclosed embodiments can be applied to solve the problem of emotion dimensionality measurement and prediction in a pure computational way.

In an embodiment, the basic emotion understanding and prediction module 214 is configured to use the emotion to vector model 206 to solve the problem of emotion basicality measurement and prediction in a pure computational way. Basic emotions are like primary colors, they are often the primitive building blocks of other non-basic emotions, which are considered to be variations, or blends of the basic emotions. Even till now, there is no agreement between psychologists on the set of basic emotions. In one embodiment, to determine the basicality of emotions, the basic emotion understanding and prediction module 214 can be configured to use various clustering algorithms on the derived emotion embeddings. For instance, in some embodiments, the basic emotion understanding and prediction module 214 can apply Kmeans on all the emotions and determine the optional number of K using the elbow based method. In one embodiment, once the clustering is done, the basic emotion understanding and prediction module 214 identifies the base emotions as the emotions that are closest to the center of a cluster. For example, in one embodiment, by applying the clustering method on the derived emotion embeddings, the basic emotion understanding and prediction module 214 identifies "Anger", "Disgust", "Fear", "Happiness", and "Sadness" as the basic emotions.

In an embodiment, the domain-specific emotional taxonomies module 216 is configured to create domain-specific emotional taxonomy using the emotion to vector model 206. For example, in one embodiment, the domain-specific emotional taxonomies module 216 is configured to apply the emotion to vector model to recognize all the possible emotions in the customer service domain to capture the nuanced variations of emotions in a domain. For example, in one embodiment, for any new customer request, the domain-specific emotional taxonomies module 216 can be configured to infer, using the emotion to vector model, a customized emotion label for the customer request based on the learned parameters. By aggregating all inferred emotion labels from all user requests, the domain-specific emotional taxonomies module 216 can generate a customized emotion taxonomy for the customer service domain, which will cover a much wider span of emotions than the basic ones. Identifying emotions in a customer service domain is just one example use case illustrating the practical implication of the disclosed embodiments. The disclosed embodiments can also be applied to any domain with emotion as key construct for better user experience. These include, but not limited to, building early depression warning systems, and e-learning systems that can automatically detect and adjust to the emotional state of the users.

Figure 5:
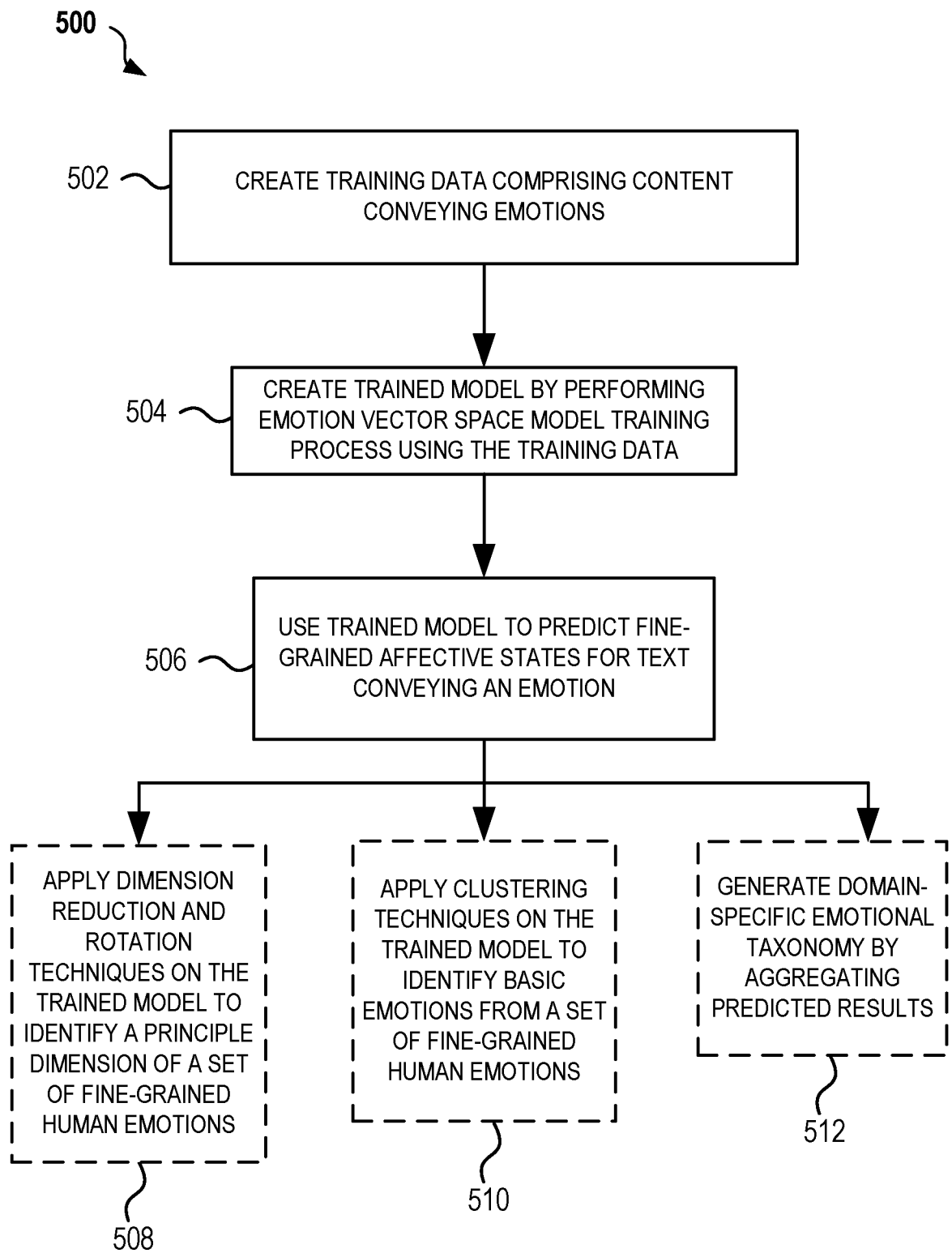
FIG. 5 is a flowchart illustrating a method for fine-grained affective states prediction according to an embodiment of the present disclosure.

FIG. 5 is a flowchart illustrating a process 500 for fine-grained affective states prediction according to an embodiment of the present disclosure. The process 500 can be performed by the fine-grained emotion application 110 of the emotion identification system 100 in FIG. 1.

At step 502, the process 500 creates training data comprising content conveying emotions. As described above, content conveying emotions can be obtained from various sources including, but are not limited to, consulting domain experts on a list of fine-grained emotions specific to a certain domain, and/or collecting human emotions from online sources or content. As an example, the process 500 can identify a set of candidate emotions that people expressed on social media. For instance, in one embodiment, a keyword-based mechanism can be adopted to extract social media postings containing the keyword "feel", "feeling", and "felt" for a particular timeframe. Non-limiting example expressions captured by this keyword-based mechanism could include "I always feel so tried and stressful", "If you're feeling down like I am", and "I felt so sad" etc.

A dependency parser can be used to construct dependency relations between words appearing in a social media post. In one embodiment, the process 500 extracts all the adjective and noun terms that have dependencies with the keywords and treat them as candidate emotions for the input layer of the feedforward neural network. As an example, in one implementation, the process 500 identified 494 emotions that appeared for more than 100 times in the collected data (over 4 billion social media postings). The top 10 occurred emotions in the dataset are: Bad, Good, Sorry, Sick, Sad, Attacked, Happy, Guilty, Blessed, and Safe.

With the set of emotions, the process 500 can use a soft labeling method for creating an automatically labeled emotion dataset for training the model. Additionally, several filtering heuristics can be applied to remove the duplicates (e.g., shared postings), spam postings, or other types of substandard postings that were captured in the initial search. In some embodiments, after the filtering process, the process 500 deletes all emotions with less than predetermined number of appearances for better generalizability of the derived emotion vectors. In one implementation, after the above steps, 197 emotions remained as shown in FIG. 4.

Once the training data is obtained, the process 500, at step 504, creates a trained model by performing an emotion vector space model training process using the training data. In some embodiments, before training, the process 500 performs some preprocessing on the collected emotional dataset, including: removing mentions, URLs, punctuations, as well as the emotional hashtags served as the emotion labels, tokenizing into words, and converting into lower cases. In some embodiments, to avoid class imbalance problem, the process 500 randomly samples up to a predetermined number of postings (e.g., 20,000 tweets) for all emotions. As described above, in one embodiment, the process 500 uses a feedforward neural network, as shown in FIG. 3, for training the model. Once the model has been trained, the process 500, at step 506, can use the trained model to predict fine-grained affective states for text conveying an emotion.

The trained model can also be used in various applications. For example, at step 508, the process 500 can apply dimension reduction and rotation techniques on the trained model to identify a principle dimension of a set of fine-grained affective states. The process 500, at step 510, can apply clustering techniques on the trained model to identify basic emotions from a set of fine-grained affective states. Additionally, the process 500, at step 512, can generate domain-specific emotional taxonomy by aggregating predicted results as described above.

It should be apparent from the foregoing that the disclosed embodiments have significant advantages over current art. Most of the existing emotion evaluation and understanding methods were proposed from the psychology domain and almost all of them needs some sorts of human intervention within the process of emotion evaluation and understanding, so that the process could be very subjective and hard to be applied to large scale scenarios. The disclosed embodiments free people from the emotion valuation pipeline and tries to understand human emotions in natural settings from human's daily writings. So compared with the existing methods, the proposed embodiments is human-independent, less subjective, and easy to scale.

Additionally, the proposed embodiments enable machines to better understand and predict more fine-grained emotions in terms of their emotionality and basicality. In practice, this can benefit any domain with the need to understand their user's emotions. Theoretically, the disclosed embodiments can be used to revisit some of the existing psychological theories and frameworks.

The disclosed embodiments provide significant benefits to the design and implementation of emotion-aware tools and systems. For instance, being able to differentiate the fine-grained emotions, a system is able to better accommodate to its users, using more appropriate words and responses, and thus, improving the efficiency and operations of the system. Another advantage is that the disclosed embodiments can be used to create domain-specific emotion taxonomies. This could be of significant value to domains, such as customer service, as understanding the fine-grained variations of emotions other than the basic ones are also important.

Figure 6:
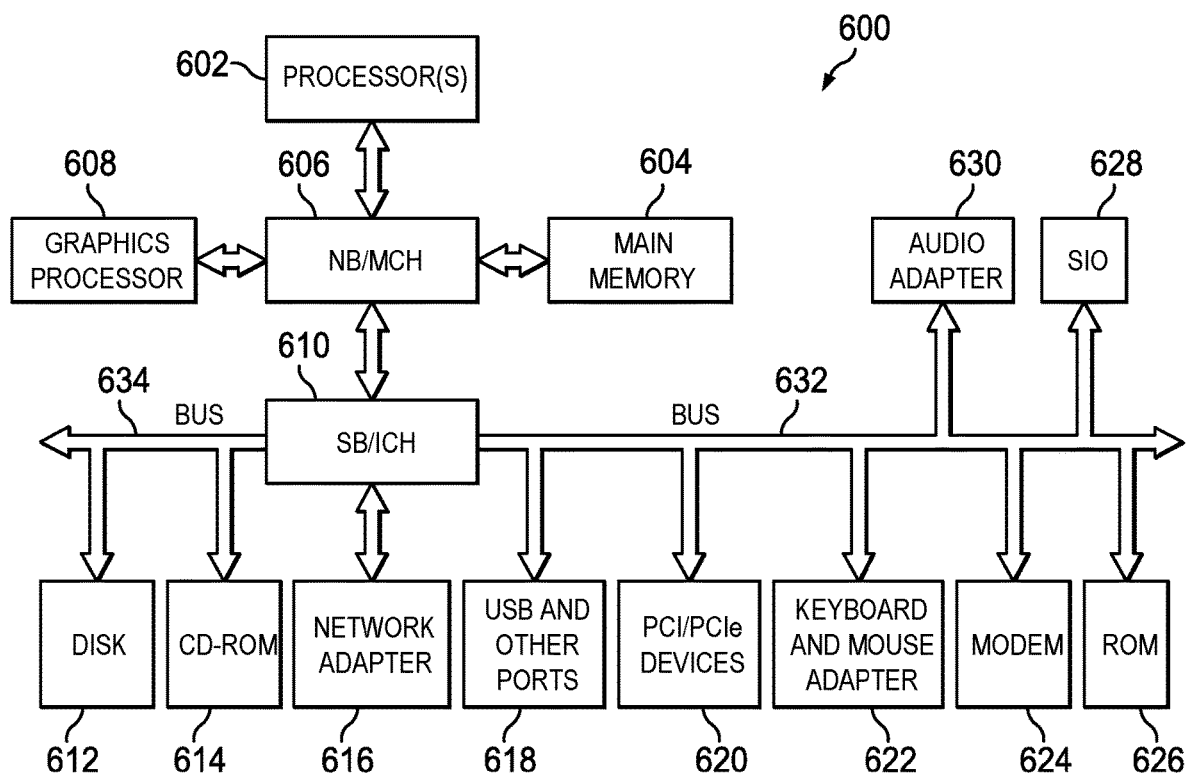
FIG. 6 a schematic diagram illustrating a high level hardware architecture of a cognitive digital assistant system according to an embodiment of the present disclosure.

FIG. 6 is a block diagram of an example data processing system 600 in which aspects of the illustrative embodiments may be implemented. Although data processing system 600 depicts the basic components of a computing system, the disclosed embodiments may also be implemented in very advance systems such as an IBM® Power 750 servers or the IBM Watson® supercomputer, which employs a cluster of ninety IBM Power 750 servers, each of which uses a 3.5 GHz POWER7 eight-core processor, with four threads per core.

In the depicted example, the data processing system 600 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP). A computer bus, such as bus 632 or bus 634, may be implemented using any type of communication fabric or architecture that provides for a transfer of data between different components or devices attached to the fabric or architecture.

In the depicted example, LAN adapter 616 connects to SB/ICH 610. Audio adapter 630, keyboard and mouse adapter 622, modem 624, read-only memory (ROM) 626, hard disk drive (HDD) 612, compact disk read-only memory (CD-ROM) drive 614, universal serial bus (USB) ports and other communication ports 618, and peripheral component interconnect/peripheral component interconnect express (PCI/PCIe) devices 620 connect to SB/ICH 610 through bus 632 and bus 634. PCI/PCIe devices may include, for example, Ethernet adapters, add-in cards, and PC cards for notebook computers. PCI uses a card bus controller, while PCIe does not. ROM 626 may be, for example, a flash basic input/output system (BIOS). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. Super I/O (SIO) device 628 may be connected to SB/ICH 610. In some embodiments, HDD 612 may be replaced by other forms of data storage devices including, but not limited to, solid-state drives (SSDs).

An operating system runs on processor(s) 602. The operating system coordinates and provides control of various components within the data processing system 600 in FIG. 6. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on data processing system 600.

The data processing system 600 may include a single processor 602 or may include a plurality of processors 602. Additionally, processor(s) 602 may have multiple cores. For example, in one embodiment, data processing system 600 may employ a large number of processors 602 that include hundreds or thousands of processor cores. In some embodiments, the processors 602 may be configured to perform a set of coordinated computations in parallel.

Instructions for the operating system, applications, and other data are located on storage devices, such as one or more HDD 612, and may be loaded into main memory 604 for execution by processor(s) 602. In some embodiments, additional instructions or data may be stored on one or more external devices. The processes for illustrative embodiments of the present invention may be performed by processor(s) 602 using computer usable program code, which may be located in a memory such as, for example, main memory 604, ROM 626, or in one or more peripheral devices.

The disclosed embodiments can be implemented as a system, as a computer implemented method, and/or as a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for fine-grained affective states prediction, the computer-implemented method comprising:
    creating training data comprising content conveying emotions;
    creating a trained model by performing an emotion vector space model training process using the training data to train a model using a feed forward neural network, wherein the emotion vector space model training process converts discrete emotions into emotion vector representations, wherein an output layer of the feed forward neural network are word vectors that indicate probabilities of words and emojis that are within a window size of an emotion vector representation that is input for an input layer of the feed forward neural network, and wherein a hidden layer of the feed forward neural network is represented by a weight matrix with a row for each of the discrete emotions and a column for every hidden neuron in the hidden layer; and
    using the trained model to predict fine-grained affective states for text conveying an emotion.

2. The method of claim 1, further comprising applying dimension reduction and rotation techniques on the trained model to identify a principle dimension of a set of fine-grained affective states.

3. The method of claim 1, further comprising applying clustering techniques on the trained model to identify basic emotions of a set of fine-grained affective states.

4. The method of claim 1, further comprising generating domain-specific emotional taxonomy by aggregating predicted results.

5. The method of claim 1, wherein the emotion vector space model training process further comprises projecting the emotion vector representations of the fine-grained affective states into a distributed vector space, wherein similar fine-grained affective states are close to each other in the distributed vector space.

6. The method of claim 5, further comprising gathering all sentences from the content conveying emotions that express a same emotional state together into a corresponding emotional document to form an input layer of the feed forward neural network.

7. The method of claim 6, wherein the emotion vector space model training process further comprises converting words in the corresponding emotional document into word vectors and projecting the word vectors into the distributed vector space.

8. The method of claim 1, wherein creating training data comprising content conveying emotions comprises gathering content that includes fine-grained emotions from online content based on context dependencies.

9. The method of claim 8, wherein the training data comprises a random sampling of a same number of the content conveying emotions for each of the fine-grained emotions.

10. The method of claim 1, wherein creating the training data comprising crawling for online posts containing a keyword, parsing the online posts containing the keyword to construct dependency relations between words appearing in the online posts, and extracting adjective terms that have dependencies with the keyword and treating the adjective terms as discrete emotions in the training data.

11. The method of claim 10, further comprising deleting all discrete emotions with less than predetermined number of appearances from the training data.

12. The method of claim 10, further comprising removing duplicate online posts containing the keyword found after crawling for the online posts containing the keyword.

13. The method of claim 10, further comprising randomly sampling up to a predetermined number of the online posts for each of the discrete emotions.

14. A system configured to predict fine-grained affective states, the system comprising a processor configured to execute instructions to:
create training data comprising content conveying emotions;
create a trained model by performing an emotion vector space model training process using the training data to train a model using a feed forward neural network, wherein the emotion vector space model training process converts the discrete emotions into emotion vector representations, wherein an output layer of the feed forward neural network are word vectors that indicate probabilities of words and emojis that are within a window size of an emotion vector representation that is input for an input layer of the feed forward neural network, and wherein a hidden layer of the feed forward neural network is represented by a weight matrix with a row for each of the discrete emotions and a column for every hidden neuron in the hidden layer; and
use the trained model to predict fine-grained affective states for text conveying an emotion.

15. The system of claim 14, further comprising applying dimension reduction and rotation techniques on the trained model to identify a principle dimension of a set of fine-grained affective states.

16. The system of claim 14, further comprising applying clustering techniques on the trained model to identify basic emotions of a set of fine-grained affective states.

17. The system of claim 14, further comprising generating domain-specific emotional taxonomy by aggregating predicted results.

18. The system of claim 14, wherein the emotion vector space model training process further comprises projecting the emotion vector representations of the fine-grained affective states into a distributed vector space, wherein similar fine-grained affective states are close to each other in the distributed vector space.

19. The system of claim 18, further comprising gathering all sentences from the content conveying emotions that express a same emotional state together into a corresponding emotional document to form an input layer of the feed forward neural network.

20. The system of claim 19, wherein the emotion vector space model training process further comprises converting words in the corresponding emotional document into word vectors and projecting the word vectors into the distributed vector space.

* * * * *